(12) United States Patent
Dang et al.

(10) Patent No.: US 8,060,540 B2
(45) Date of Patent: Nov. 15, 2011

(54) DATA RELATIONSHIP VISUALIZER

(75) Inventors: Yingnong Dang, Beijing (CN); Xu Yang, Beijing (CN); Dongmei Zhang, Redmond, WA (US); Min Wang, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 273 days.

(21) Appl. No.: 11/764,354

(22) Filed: Jun. 18, 2007

(65) Prior Publication Data
US 2008/0313211 A1 Dec. 18, 2008

(51) Int. Cl.
*G06F 17/30* (2006.01)

(52) U.S. Cl. ........ 707/805; 707/797; 707/804; 707/811; 707/812

(58) Field of Classification Search ............... 707/1, 100, 707/102, 104.1, 200, 797, 802, 804, 812, 707/805, 811
See application file for complete search history.

(56) References Cited

U.S. PATENT DOCUMENTS

| | | | |
|---|---|---|---|
| 5,966,139 A | 10/1999 | Anupam et al. | |
| 6,496,208 B1 | 12/2002 | Bernhardt et al. | |
| 6,615,211 B2 * | 9/2003 | Beygelzimer et al. | 707/6 |
| 6,738,759 B1 * | 5/2004 | Wheeler et al. | 707/741 |
| 6,873,325 B1 | 3/2005 | Kontkanen et al. | |
| 7,003,509 B2 * | 2/2006 | Andreev | 707/999.002 |
| 7,038,680 B2 | 5/2006 | Pitkow | |
| 7,062,508 B2 * | 6/2006 | Andreev et al. | 707/102 |
| 7,216,129 B2 * | 5/2007 | Aono et al. | 707/102 |
| 7,425,963 B2 * | 9/2008 | Gargi et al. | 345/589 |
| 7,433,885 B2 * | 10/2008 | Jones | 707/999.01 |
| 7,457,860 B2 * | 11/2008 | Shang et al. | 709/223 |
| 7,752,233 B2 * | 7/2010 | Vempala et al. | 707/802 |
| 2002/0188618 A1 | 12/2002 | Ma et al. | |
| 2003/0071815 A1 | 4/2003 | Hao et al. | |
| 2004/0090472 A1 | 5/2004 | Risch et al. | |
| 2005/0012743 A1 | 1/2005 | Kapler et al. | |
| 2005/0065963 A1 | 3/2005 | Ziemann et al. | |

(Continued)

FOREIGN PATENT DOCUMENTS
WO W00135271 A1 5/2001
(Continued)

OTHER PUBLICATIONS

Santos, "A Framework for the Visualization of Multidimensional and Multivariate Data", University of Leeds, Sep. 2004, pp. 1-237.

(Continued)

*Primary Examiner* — Tim T Vo
*Assistant Examiner* — Dangelino Gortayo
(74) *Attorney, Agent, or Firm* — Russell S. Krajec; Krajec Patent Offices, LLC (57) ABSTRACT

Data having express or implied relationships may be displayed by selecting a starting entity in a data structure, building a relationship tree, and building and optimizing a relationship matrix based on the relationship tree. The optimized relationship matrix may be used to layout and render a graphical image that positions various elements with respect to the starting entity based on the relationships. The distance matrix may be optimized by creating a first distance matrix based on the relationship tree, developing a dissimilarity matrix based on expressed or implied relationships, and multiplying the dissimilarity matrix by a weighting factor to determine a distance matrix that may be optimized by multi-dimensional scaling. An optimized weighting factor may be determined and used to select an optimized distance matrix.

19 Claims, 5 Drawing Sheets

DISPLAY WITH ITEMS AND RELATIONSHIPS

U.S. PATENT DOCUMENTS

| | | | |
|---|---|---|---|
| 2006/0015805 A1 | 1/2006 | Humenansky et al. | |
| 2006/0039601 A1 | 2/2006 | Nair et al. | |
| 2006/0277203 A1 | 12/2006 | Uittenbogaard | |
| 2007/0118370 A1* | 5/2007 | Chu | 704/230 |
| 2007/0239694 A1* | 10/2007 | Singh et al. | 707/3 |
| 2007/0255707 A1* | 11/2007 | Tresser et al. | 707/6 |
| 2008/0162541 A1* | 7/2008 | Oresic et al. | 707/102 |

FOREIGN PATENT DOCUMENTS

WO  WO 2006114479 A1 *  11/2006

OTHER PUBLICATIONS

Fua et al, "Hierarchical Parallel Coordinates for Exploration of Large Datasets", IEEE, 1999, pp. 1-9.

Fischer, "MDS-Views: Visualizing Problem Report Data of Large Scale Software using Multidimensional Scaling", Jun. 2, 2003, pp. 1-13.

International Search Report and Written Opinion for PCT Application No. PCT/US2008/067336.

* cited by examiner

DATA RELATIONSHIP VISUALIZER

BACKGROUND

Visualizing and presenting data in a computer system can be a difficult task, especially when disparate data may be displayed. In many cases, data may have relationships between entities, which can make displaying related entities somewhat more complicated, especially when some entities have no express relationships to other entities.

Relationships can be expressed in many ways, including positive relationships, where two entities may be closely related, and negative relationships where two entities may be opposed to each other. Some relationships may be very strong, while other relationships may be categorized as weak.

SUMMARY

Data having express or implied relationships may be displayed by selecting a starting entity in a data structure, building a relationship tree, and building and optimizing a relationship matrix based on the relationship tree. The optimized relationship matrix may be used to layout and render a graphical image that positions various elements with respect to the starting entity based on the relationships. The distance matrix may be optimized by creating an initial distance matrix based on the relationship tree, developing a dissimilarity matrix based on expressed or implied relationships, and combining the dissimilarity matrix, a weighting factor, and the initial distance matrix to determine a distance matrix that may be optimized by multi-dimensional scaling. An optimized weighting factor may be determined and used to select an optimized distance matrix.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Items with various relationships may be analyzed to determine a graphical representation of strength of relationships. The strength of relationships may be shown by locating strongly related items near to each other and poorly or negatively related items far away from each other.

The distance of each item to a root item may be calculated by constructing a relationship tree and a first distance matrix based on the relationship tree. A dissimilarity matrix may be constructed using additional relationships, which may be combined to the first distance matrix using an optimized weighting factor. The combined elements may make up a second distance matrix that may be analyzed using multi dimensional scaling to produce a third distance matrix.

The third distance matrix may be used by a layout engine to place items in relation to each other, then a renderer may create an image to view.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1:
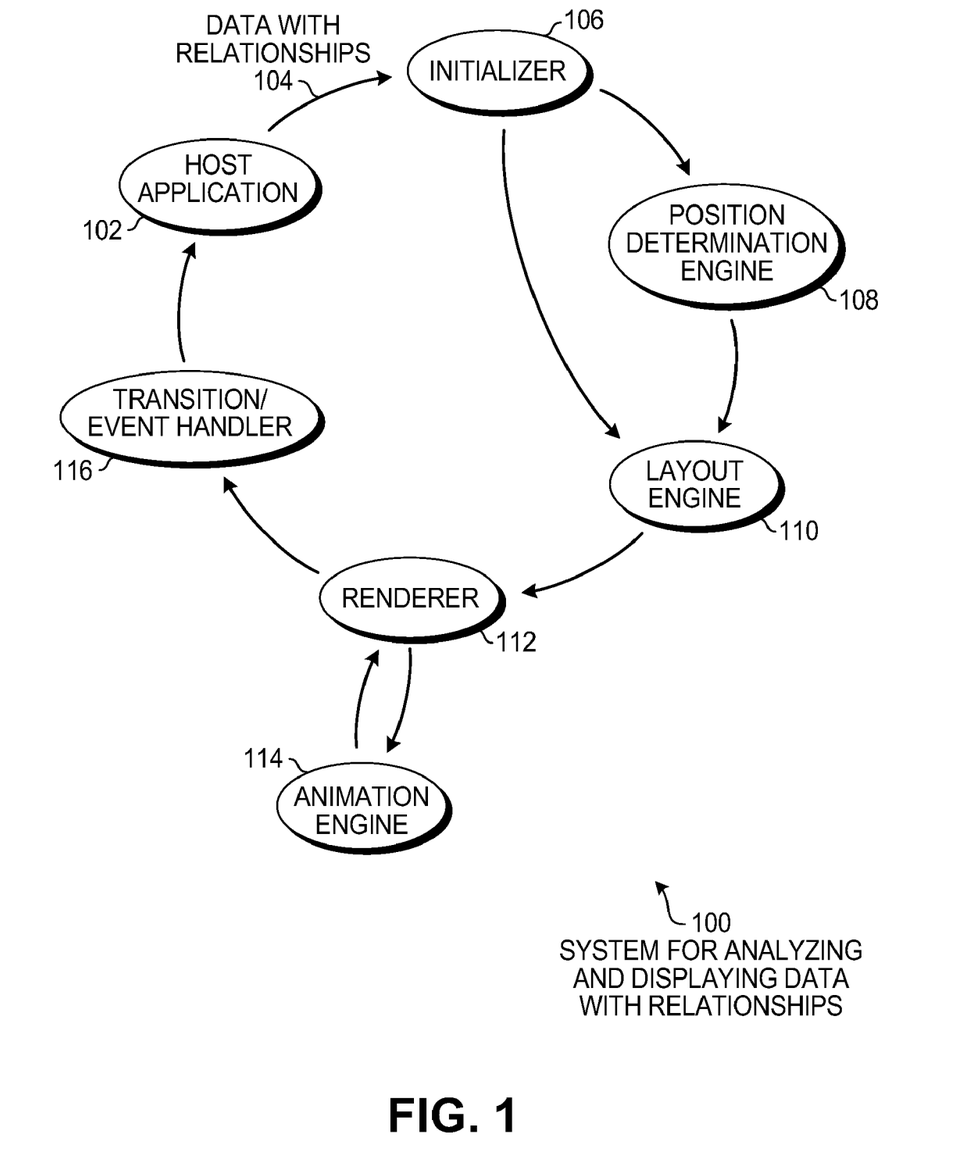
FIG. 1 is a diagram illustration of an embodiment showing a system for analyzing and displaying data with relationships.

FIG. 1 is a diagram of an embodiment 100 showing a system for analyzing and displaying data with relationships. Embodiment 100 illustrates an embodiment wherein a host application 102 may transfer data with relationships 104 to a set of routines that may determine item positions, then layout and render an image. The routines may be a shared library or set of routines that interface with multiple host applications. In other embodiments, the various routines may be incorporated into a host application or may be a standalone application to analyze and present data.

The data with relationship 104 may be any type of data containing any type and number of relationships between various items. Each item may represent any type of information or object.

The relationships may be any type of relationship defined in any manner. In many cases, express relationships such as parent/child, peer to peer, one to many, many to many, many to one, or any other express relationship may be used. Each embodiment may use different mechanisms or syntax to define such relationships. In some cases, implied relationships may exist between items.

The initializer 106 may read the data and relationships 104 and perform preliminary operations prior to analysis.

The position determination engine 108 may create a distance matrix that describes the relationships between a root item and other items in the dataset. The distance matrix may be determined by constructing a hierarchical relationship tree with the root item as the starting point for the tree. The express or implied relationships in the dataset 104 may be used to construct the tree. A first distance matrix may be constructed from the relationship tree using numerical values to express the relationships between items.

A dissimilarity matrix may be constructed from all of the relationships in the dataset 104. A dissimilarity matrix may define each relationship, including relationships that may not be included in the relationship tree. In many cases, a relationship may be expressible as a numerical value and a dissimilarity value may be derived from the relationship value.

The dissimilarity matrix and the first distance matrix may be combined into a second distance matrix by various mechanisms, including using a weighting factor. In some embodiments, the weighting factor may be optimized for each computation.

The second distance matrix may be analyzed using multi dimensional scaling to determine a third distance matrix.

A layout engine 110 may use the distance matrix determined by the position determination engine 108 to layout various items into a graphical image that may be rendered by the renderer 112. In some instances, an animation engine 114 may animate various aspects of the image, including changing from one image to another by repositioning various items within the image.

The layout engine 110 may position graphical representations of items in a two dimensional space for presentation. The layout engine 110 may use data, such as graphical icons or other information from the dataset 104 to construct a visual image. An example of such an image may be shown later in this specification.

The renderer 112 may produce an image that may be presented on a display device, such as a computer display, printer, or other output device. In some cases where a dynamic display is present, the animation engine 114 may produce moving or translating icons, relationship lines, or other animated elements to show the transformation from one set of positions to another.

The transition/event handler 116 may be an interface to the host application 102 that communicates program control, input data, or other information to the host application 102.

Figure 2:
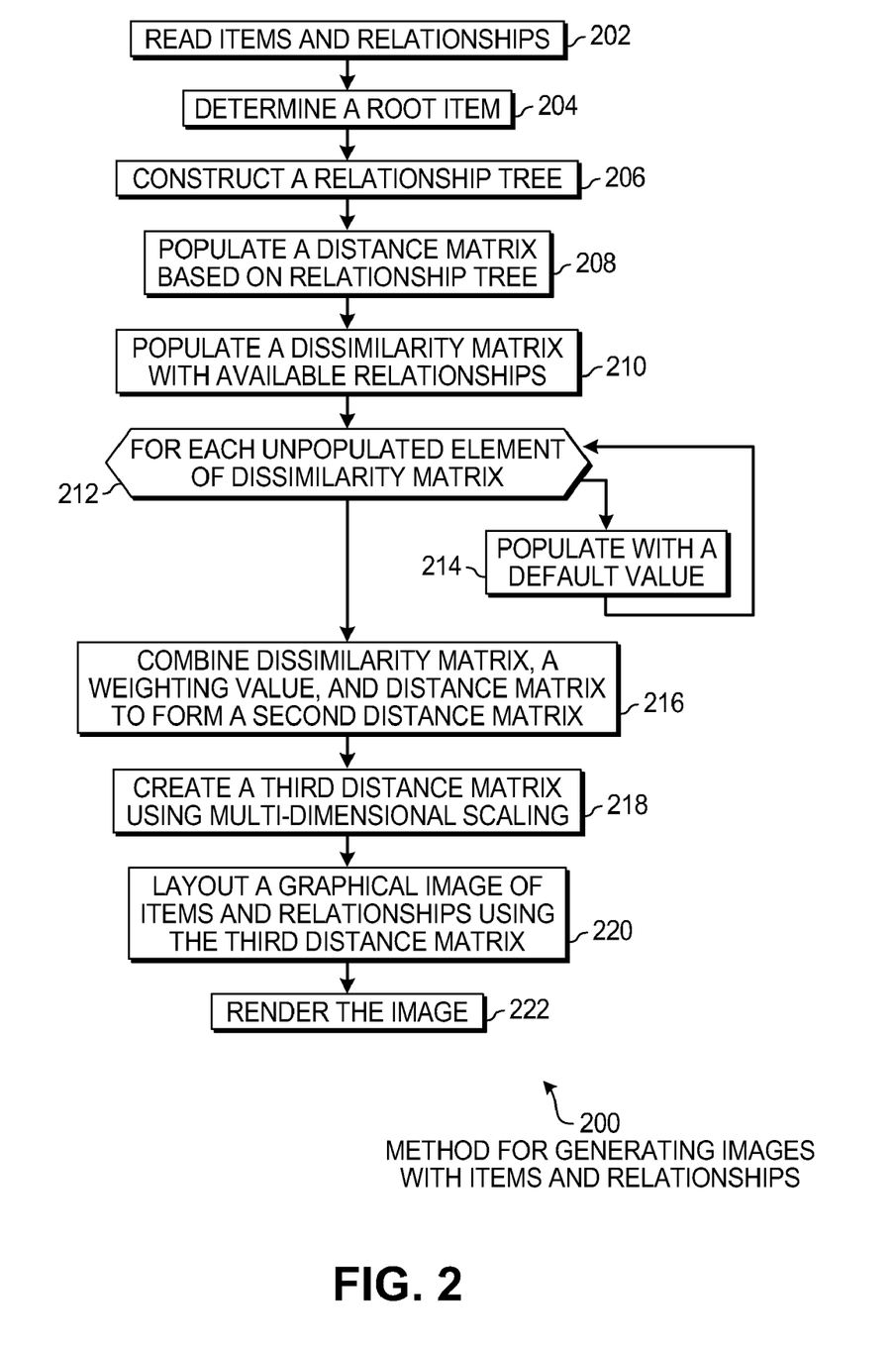
FIG. 2 is a flowchart illustration of an embodiment showing a method for generating images with items and relationships.

FIG. 2 is a flowchart illustration of an embodiment 200 showing a method for generating images having items and relationships. Embodiment 200 is merely one example of many embodiments that create a relationship tree, generate a distance matrix from the relationship tree, combine the distance matrix with a dissimilarity matrix, and determine a third distance matrix using multi dimensional scaling. Other embodiments may use different steps, sequences, or methods to achieve a similar method and outcome.

The items and relationships may be read in block 202. In some instances, relationships may be defined in various manners, including relationships that are bidirectional but have different characteristics in each of the directions. Other relationships may include one way or bidirectional relationships. Some relationships may be peer to peer relationships or parent/child relationships. Some relationships may also be one to many, many to one, many to many, or one to one relationships.

Each embodiment may have a particular syntax and expressions that may be interpreted to determine the existence, type, and severity or strength of a relationship. In some instances, a relationship may have a strength that is expressed qualitatively or quantitatively. Some embodiments may have implied or qualitative relationships that may be analyzed and quantified for analysis.

A root item is determined in block 204. The root item is an item from which other relationships will be determined and be used in the construction of an image. In some cases, a representation of the root item may be displayed within the image, often in a prominent location such as the center as part of a spider diagram or as the top of a hierarchy. In some cases, the root item may not be displayed.

A root item may be determined by an algorithm or by a user selection in block 204. Depending on the type of graphical representation and how the method is called, a user may be able to select the root item for a particular image. In other embodiments, an application or routine that calls the embodiment 200 may determine a root item through various algorithms.

A relationship tree may be created in block 206. A relationship tree may be a hierarchical tree that shows relationships from the root item to other items in the dataset. In many cases, a relationship tree may be illustrated as the root item from which other items depend or are related. Those items with any type of direct relationship to the root item may be illustrated as a first generation of items, and items with a direct relationship to the first generation of items may be shown as a second generation, and so forth.

In some embodiments, a relationship may be expressed as a positive relationship, where two items are closely related, or a negative relationship where items are diametrically opposed or are opposite of each other. In some such embodiments, a relationship tree may be constructed using any relationship, positive or negative, to construct a relationship tree.

The relationship tree may be used to populate a distance matrix in block 208 based on the number of generations removed an item may be from the root item. Each embodiment may use different methods or techniques for generating a relationship tree.

A dissimilarity matrix may be populated using all of the relationships defined in the dataset in block 210. In many cases, the relationship tree of block 206 may contain a portion of all of the relationships between items in the dataset. A dissimilarity matrix may define those relationships plus any other relationships.

Dissimilarity may be defined in many different manners. In some embodiments, dissimilarity may be defined using a numerical value. For example, a relationship may be expressed as a value from 0 to 1, where 0 is a negative or repulsive relationship and 1 is a positive or attractive relationship. In another example, a similar value range may be used to express a very strong relationship as 1 and a very weak relationship as a very small number greater than zero. In either example, a dissimilarity value may be computed as one minus the relationship value.

Other embodiments may express a dissimilarity or relationship value as ranging from 10 as a positive, attractive or similar relationship to minus 10 as a repulsive or dissimilar relationship. Each embodiment may use a different nomenclature and syntax to express the type and severity of the relationships between items. In some embodiments, a qualitative expression may include values of "weak" and "strong", for example.

For each unpopulated element of the dissimilarity matrix in block 212, the element may be populated with a default value in block 214. Each embodiment may have a predefined default value for unassigned or unavailable relationships.

The dissimilarity matrix may be combined with the distance matrix using a weighting value to form a second distance matrix in block 216. In some cases, the second distance matrix may be calculated as follows:

Suppose the first distance matrix is D1, the dissimilarity matrix is S, weighting value is Lambda, and the second distance matrix is D2. For S(i,j) with valid value, D2(i, j)=(1−Lambda)×D1(i, j)+Lambda×S(i,j). If S(i,j) is not valid, D2(i, j)=D1(i, j).

Each embodiment may have a different manner for combining the dissimilarity matrix, weighting value, and first distance matrix.

In many embodiments, the weighting factor may be optimized. Such an embodiment is discussed later in this specification.

A third distance matrix may be created using multi dimensional scaling in block 218. Multi dimensional scaling ('MDS') may determine an optimized spacing or distance between items having a defined set of relationships. In many cases, MDS may create an optimized position in a space defined by many dimensions.

In some embodiments, an MDS analysis in multi-dimensional space may be translated into a two dimensional distance by taking the root mean square of each distance from the root item to another item to be determined.

A graphical image may be laid out in block 220 using the output of block 218. An example of one of such images is discussed later in this specification. The graphical image may be a normalized or scaled representation of the dataset or a portion of the dataset. For example, in some cases, a root item may be displayed with one or two generations of items from the relationship tree defined in block 206. In other cases, many more generations of items may be displayed or items with a certain relationship distance from the root item may be displayed. After the image is laid out in block 220, the image may be rendered in block 222.

Figure 3:
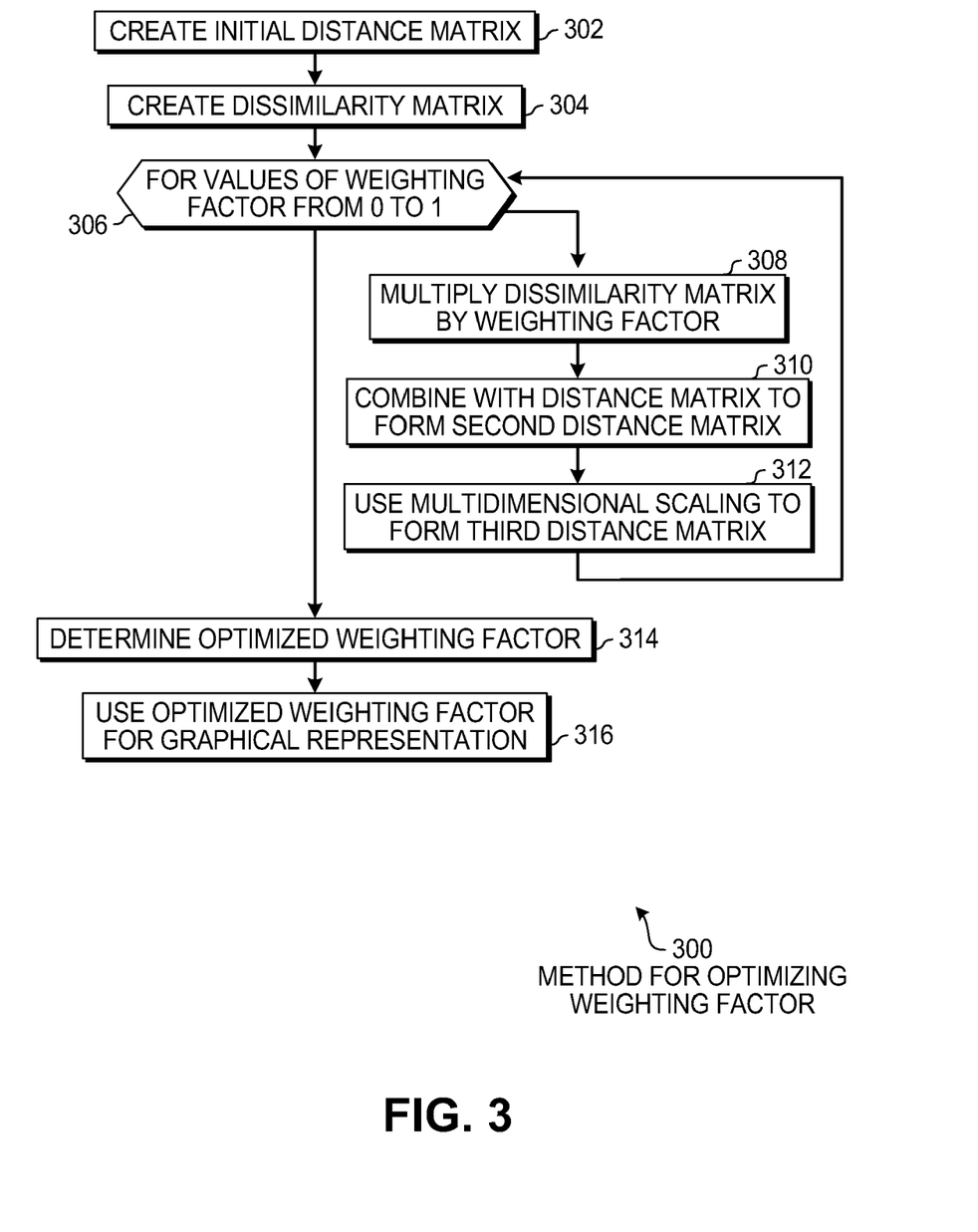
FIG. 3 is a flowchart illustration of an embodiment showing a method for optimizing weighting factors.

FIG. 3 is a flowchart diagram of an embodiment 300 showing a method for optimizing a weighting factor. The weighting factor may be used to combine the first distance matrix as determined from a relationship tree with a dissimilarity matrix that may contain any relationship defined in a dataset. Embodiment 300 is a method by which different values of a weighting factor may be used and the results evaluated to determine an optimum value of the weighting factor.

An initial or first distance matrix may be determined in block 302. In many embodiments, the first distance matrix may be populated from a relationship tree constructed from a root item as discussed in blocks 204, 206, and 208 of FIG. 2.

A dissimilarity matrix may be created and populated in block 304 in a similar manner as in blocks 210, 212, and 214 of FIG. 2.

For values of the weighting factor between 0 and 1 in block 306, a set of analyses may be performed to multiply the dissimilarity matrix by the weighting factor in block 308, and combine with the first distance matrix in block 310 to form a second distance matrix. The second distance matrix may be analyzed using multi dimensional scaling in block 312 to form a third distance matrix.

Each embodiment may use different mechanisms or syntax to define the weighting factor and describe effects of changing the weighting factor. For example, in some embodiments, a weighting factor of 0 may cause the dissimilarity matrix to have no effect on the second distance matrix.

Other embodiments may use different values of the weighting factor in block 306 to achieve multiple results so that an optimum value of the weighting factor may be determined. For example, weighting factors from 0 to 10, 0 to 100, −1 to 1, or some other range may be evaluated, based on the syntax and how elements and relationships within the dataset are defined.

In block 314, an optimized weighting factor may be determined in block 314 by analyzing the results of the various analyses performed in block 312.

One mechanism for determining which weighting factor is an optimal weighting factor may be to evaluate the calculated stress as a result of the multi dimensional scaling analysis of block 312. In many MDS analyses, stress is an optimization factor that is used to determine a degree of fit for a calculated result.

Other embodiments may have different methods and mechanisms for determining an optimum value of a weighting factor. One such method may be found later in this specification under the discussion of FIG. 4.

After selecting an optimized weighting factor in block 314, that weighting factor is used in graphical representation of the data in block 316.

Other embodiments may have different methods for determining an optimized weighting factor. For example, some embodiments may use a recursive computational method for optimizing a weighting value by finding a maximum or minimum value of an optimizing parameter.

Figure 4:
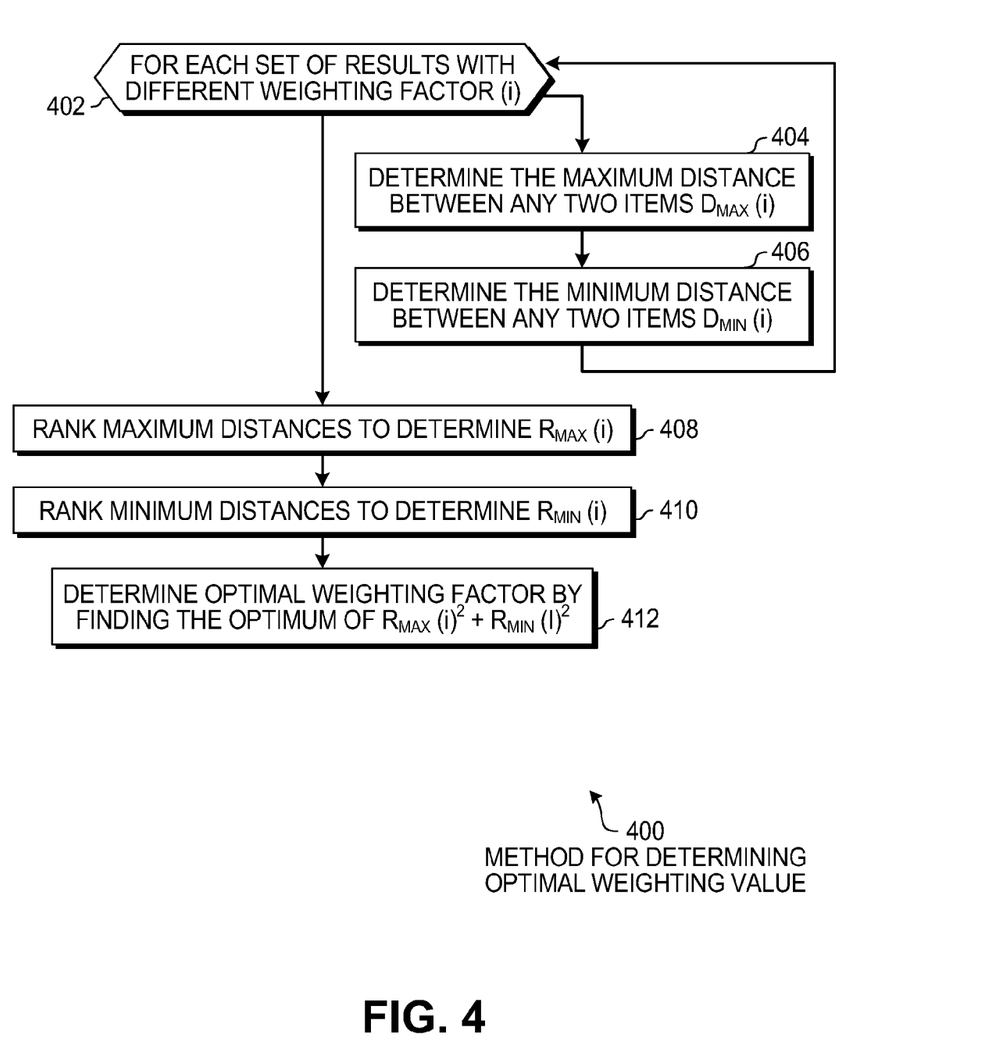
FIG. 4 is a flowchart illustration of an embodiment showing a method for selecting an optimized weighting factor.

FIG. 4 is a flowchart illustration of an embodiment 400 showing a method for determining an optimal weighting value. The embodiment 400 is one mechanism that may determine a weighting value that may result in a range of distances that are neither very large nor very small.

For each set of results with a different weighting factor designated by i in block 402, a maximum distance between any two items is determined in block 404 and designated by Dmax(i). A minimum distance between any two items is determined in block 406 and designated by Dmin(i).

The maximum distances Dmax(i) may be ranked in block 408 to determine a ranking designation Rmax(i). The ranking Rmax(i) may be determined by ranking the sets of results from large to small.

The minimum distances Dmin(i) may be ranked in block 410 to determine a ranking designation Rmin(i). The ranking Rmin(i) may be determined by ranking the sets of results from small to large.

An optimal weighting factor may be determined in block 412 by finding the optimum of the square of Rmax(i) plus the square of Rmin(i). In some embodiments, the optimum value may be the maximum value of the computation.

Other embodiments may use different methods for determining an optimum weighting value. In many embodiments, an optimum weighting value may be determined by finding a weighting value that may convey useful information in a visual representation. When very small distances between items exist, the items may be difficult to distinguish or render. Similarly, very large distances between items may cause the scale of an image to make portions of the image difficult to distinguish.

Figure 5:
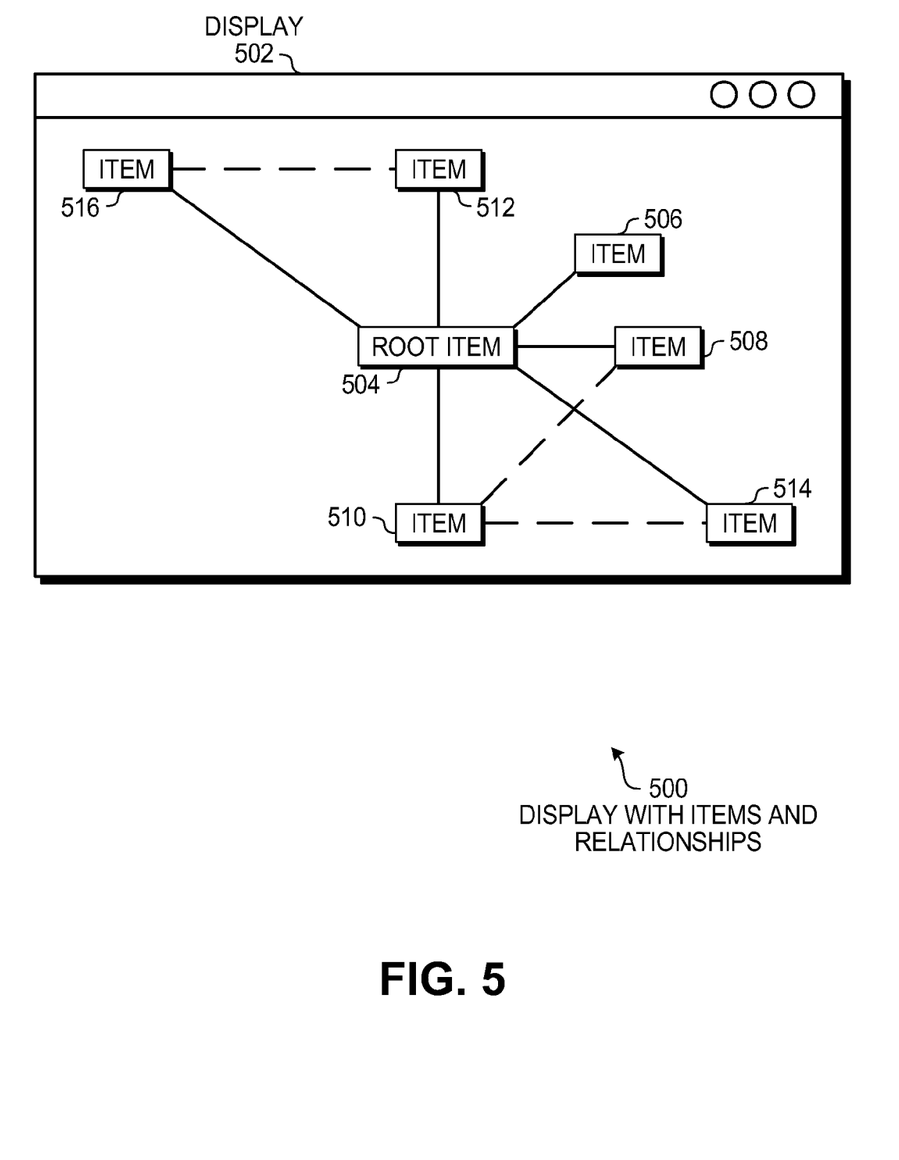
FIG. 5 is a diagram illustration of an embodiment showing a display with items and relationships.

FIG. 5 is a diagram of an embodiment 500 showing a display with items and relationships. Each embodiment may have different parameters for determining a display. Embodiment 500 illustrates the use of graphical proximity between two items to illustrate the strength of a relationship between two items. In some cases, items with less strong relationships may be illustrated as further apart.

In the display 502, a root item 504 is shown near the center of the display 502. The root item may be the item of the dataset that was identified for calculating the relationships between other items In many embodiments, a user may select the root item prior to laying out the image shown on display 502. In other embodiments, the root item may be selected by an algorithm incorporated in an application or program that generates the image.

The root item 504 is showing near items 506 and 508, but items 510 and 512 appear to be further away from the root item 504. From the graphical representation, items 506 and 508 may be more strongly related to the root item 504 than items 510 and 512. Similarly, items 514 and 516 are shown even further away from the root item 504, which can be interpreted that items 514 and 516 may be less strongly related or may be even negatively or repulsively related to the root item 504.

In many cases, a secondary relationship may be illustrated between other items as shown by the dashed lines connecting items 512 and 516, 510 and 508, and 510 and 514.

Each embodiment may have different manners for illustrating primary and secondary relationships. In embodiment 500, primary relationships with the root item 504 may be illustrated by solid lines connecting the various items, while relationships between secondary items may be illustrated by dashed lines.

Each embodiment may have two or more different visual expressions of the various relationships. For example, embodiment 500 may illustrate the root item 504 plus the other items in a first generation of relationships with the root item 504 as defined by the relationship tree. Another image may show two, three, or more generations of items. Still other images may show a predetermined number of items with the closest relationship to the root item 504 without regard to the number of generations removed an item may be.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed on a computer processor, said method comprising:
   determining a set of items, each of said items having at least one relationship with another one of said set of items;
   determining a root item from said set of items;
   constructing a relationship tree from said root item, said relationship tree being a hierarchical relationship tree;
   populating at least a portion of an initial distance matrix based on said relationship tree;
   populating a dissimilarity matrix comprising relationships not found in said relationship tree;
   determining an optimized weighting value derived from a maximum distance between a first two of said items and a minimum distance between a second two of said items;
   generating a second distance matrix by mathematically combining said dissimilarity matrix, said weighting value, and said initial distance matrix;
   laying out an image comprising at least some of said set of items and said relationships, based on said second distance matrix; and
   rendering said image.

2. The method of claim 1 further comprising:
   optimizing said second distance matrix using multi dimensional scaling.

3. The method of claim 2, said optimizing being performed for a plurality of said weighting values.

4. The method of claim 1, said determining an optimized weighting further comprising:
   determining a maximum distance for every two of said items;
   determining a minimum distance for every two of said items; and
   determining an optimal weighting factor by finding an optimum of said maximum distance squared plus said minimum distance squared.

5. The method of claim 4, said determining an optimal weighting being a recursive optimization.

6. The method of claim 1, said image comprising said root item.

7. The method of claim 1, said populating said dissimilarity matrix comprising:
   for each relationship between a pair of said items, determining a dissimilarity value for said relationship; and
   for each pair of said items for which a relationship is not present, populating said dissimilarity matrix with a default value.

8. A physical computer readable storage medium comprising computer executable instructions adapted to perform the method of claim 1.

9. A system comprising:
a position determination engine adapted to:
  receive a set of items, each of said items having at least one relationship with another one of said items;
  determine a root item from said set of items;
  construct a relationship tree from said root item, said relationship tree being a hierarchical relationship tree;
  populate at least a portion of an initial distance matrix based on said relationship tree;
  populate a dissimilarity matrix comprising relationships not found in said relationship tree;
  determine an optimized weighting value based on a maximum distance between a first two of said items and a minimum distance between a second two of said items;
  generate a second distance matrix by mathematically combining said dissimilarity matrix, said weighting value, and said initial distance matrix; and
a renderer adapted to:
  lay out a first image comprising at least some of said set of items and said relationships, based on said second distance matrix; and
  render said first image.

10. The system of claim 9, said position determination engine further adapted to:
  optimize said second distance matrix using multi dimensional scaling.

11. The system of claim 10, said optimize being performed for a plurality of said weighting values.

12. The system of claim 9, said determining an optimized weighting further comprising:
  determining a maximum distance for every two of said items;
  determining a minimum distance for every two of said items; and
  determining an optimal weighting factor by finding an optimum of said maximum distance squared plus said minimum distance squared.

13. The system of claim 12, said determining an optimal weighting factor being a recursive optimization.

14. The system of claim 9, said populate said dissimilarity matrix comprising:
  for each relationship between a pair of said items, determining a dissimilarity value for said relationship; and
  for each pair of said items for which a relationship is not present, populating said dissimilarity matrix with a default value.

15. The system of claim 9 further comprising: an animation engine adapted to animate a transition from a second image to said first image.

16. A method performed on a computer processor, said method comprising:
  determining a set of items, each of said items having at least one relationship with another one of said set of items;
  determining a root item from said set of items;
  constructing a relationship tree from said root item, said relationship tree being a hierarchical relationship tree;
  populating at least a portion of an initial distance matrix based on said relationship tree;
  populating a dissimilarity matrix comprising relationships not found in said relationship tree;
  generating a second distance matrix by mathematically combining said dissimilarity matrix, a weighting value, and said initial distance matrix;
  optimizing said second distance matrix using multi dimensional scaling;
  optimizing said weighting value by:
    determining a maximum distance for every two of said items;
    determining a minimum distance for every two of said items; and
    determining an optimal weighting value by finding an optimum of said maximum distance squared plus said minimum distance squared;
  laying out a first image comprising at least some of said set of items and said relationships based on said second distance matrix and said optimized weighting value; and
  rendering said first image.

17. The method of claim 16, said optimizing said weighting value being a recursive optimization.

18. The method of claim 16, said populating said dissimilarity matrix comprising:
  for each relationship between a pair of said items, determining a dissimilarity value for said relationship; and
  for each pair of said items for which a relationship is not present, populating said dissimilarity matrix with a default value.

19. A physical computer readable storage medium comprising computer executable instructions adapted to perform the method of claim 16.

* * * * *